United States Patent [19]

Hunsicker

[11] 4,063,036

[45] Dec. 13, 1977

[54] COIN TELEPHONE SYSTEM HAVING RESTRICTED COIN-FREE DIALING CAPABILITY

[76] Inventor: William Robert Hunsicker, 1721 Fredericksburg Pla., P.O. Box 2564, Lakeland, Fla. 33803

[21] Appl. No.: 638,835

[22] Filed: Dec. 8, 1975

[51] Int. Cl.$^2$ ............................................. H04M 17/02
[52] U.S. Cl. ............................. 179/6.3 R; 179/18 DA
[58] Field of Search ....................................... 179/6.3 R

[56] References Cited

U.S. PATENT DOCUMENTS

| 2,912,512 | 11/1959 | Pye ....................................... 179/81 A |
| 3,678,203 | 7/1972 | Lorange ............................. 179/6.3 R |
| 3,992,588 | 11/1976 | Hunsicker ......................... 179/6.3 R |

*Primary Examiner*—William C. Cooper
*Attorney, Agent, or Firm*—Duckworth, Hobby & Allen

[57] ABSTRACT

A conventional telephone pay station is adapted for coin-free restricted dialing of a preselected number of digits by employing a two-coil latching relay operating a switch for shunting outgoing calls, one coil being operated after a predetermined time delay responsive to detection of an offhook condition to open the switch, and the second coil being operated responsive to the detection of dialing by the calling party of a number of digits greater than the preselected number to close the switch. Anti-fraud circuits are provided to interrupt tone generator operation after a predesignated time delay following each digit, and to interrupt service after each hook switch operation.

29 Claims, 4 Drawing Figures

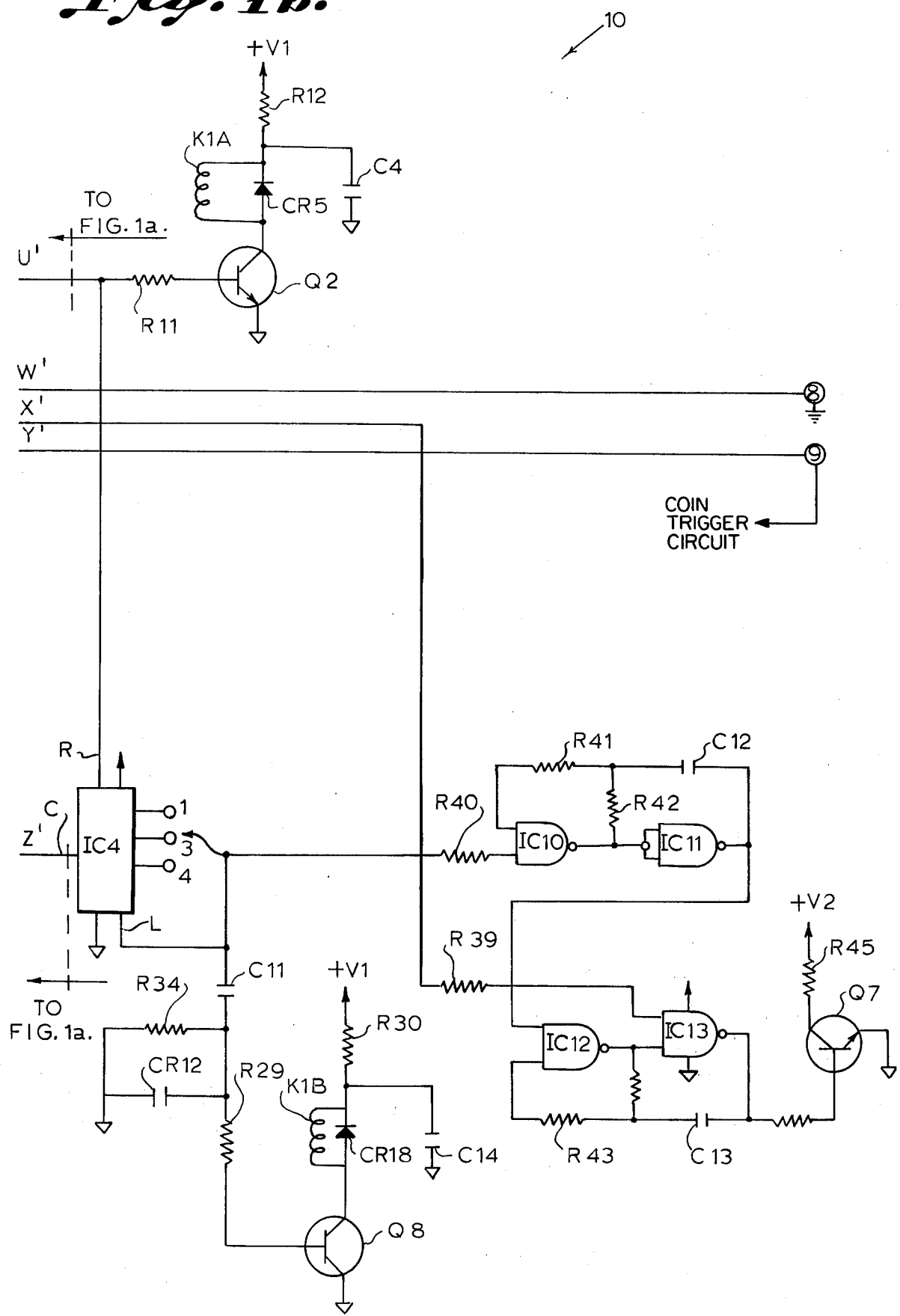

COIN TELEPHONE SYSTEM HAVING RESTRICTED COIN-FREE DIALING CAPABILITY

BACKGROUND OF THE INVENTION

1. Field of the Invention

The present invention relates to the telephone art, and more particularly relates to coin-operated telephone systems which are provided with means which allow restricted coin-free service.

2. Description of the Prior Art

Standards have been developed in the telephone industry regarding certain types of toll-free calls. Such toll-free calls are generally characterized by numbers having three or less digits; for example, toll-free calls to the operator may be made by simply dialing the single digit "0". In some areas, the number "911", or a similar three digit sequence, has been designated a toll-free number for emergency fire, police and ambulance service.

Pay stations are telephone subsets from which a call can only be placed after the insertion of coinage of specific denominations. The toll-free calls referred to above may be placed from a conventional pay station, but only after the proper amount of coinage is inserted beforehand. Since many of the toll-free emergency calls described above are frequently placed from remote locations where the proper coinage is not available, or when time is of the essence, then it is desirable to provide such pay stations with means which allow restricted coin-free dialing of these emergency numbers.

There are suggestions in the prior art for such arrangements. In U.S. Pat. No. 3,678,203, Lorange discloses a system for counting the number of dialed digits and restricting service after a preselected number of digits have been dialed. In U.S. Pat. No. 3,676,597, Peterson discloses a system which analyzes the digit value of the first three digits to determine if a proper toll-free number has been dialed. Burns, in U.S. Pat. No. 3,760,101, also teaches a system having an emergency dialing feature. These three patents are merely representative of the prior art in this area.

Some prior art coin-free pay station systems have proven to be unsatisfactory because they are susceptible to certain types of fraudulent dialing practices. One such fraudulent practice is associated with tone generator-type dialing mechanisms, and is referred to as "finger walking". This fraud constitutes the practice of sequentially dialing the digits of the called number by pressing the switch of each digit before releasing the switch of the previous digit. When such occurs, the central office recognizes a valid called number, while the coin-free circuit at the pay station "sees" only a single, continuous digit.

A second type of fraudulent practice is referred to as "hook switch dialing". This is accomplished by rapidly operating the hook switch to simulate a called number. Since most coin-free circuits reset after each hook switch operation, then a toll-free call can be placed through the central office by operating the hook switch with sufficient rapidity such that the central office recognizes a digit.

Further, many central office facilities will not complete a call from a pay station unless a coin-presence signal (referred to as "coin ground"), is received from the pay station, indicating that the proper coinage has been inserted. In U.S. patent application Ser. No. 590,003, filed on June 25, 1975, now U.S. Pat. No. 3,992,588, and which is assigned to the assignee of the present invention, I disclosed one type of a "phantom coin" circuit for use with coin-free circuits in order to satisfy this central office requirement during coin-free service.

Another problem arises with such coin-free arrangements, in that the circuit design must conform with existing pay station limitations, and be adaptable for use with a number of different pay station designs. In particular, it is often necessary to install a new coin-free circuit on working pay stations having a limited number of hook switch "leaves" available.

SUMMARY OF THE INVENTION

The present invention contemplates a telephone system including a pay station having a receiver and a transmitter coupled to a central office by a pair of line conductors through a hook switch and dialing means associated therewith, the pay station operable for initiating calls only upon the insertion therein of a coin or the like. In accordance with the present invention, the system includes a circuit for allowing a coin-free initiation of calls from the pay station without the insertion of the coin. This coin-free circuit includes first means for detecting an offhook condition of the hook switch, and second means having at least two operating conditions, including a first condition for suppressing calls from the pay station and a reset condition for allowing calls to be transmitted from the pay station to the central office through the line conductors. Third means are provided for receiving inputs responsive to operation of the dialing means for preventing dialing from the pay station to the central office after a preselected number of digits have been dialed. Fourth means are coupled to the second means and respond to detection of the offhook condition by the first means to reset the second means to thereafter allow dialing of the preselected number of digits, but only after a predetermined time delay.

A preferred embodiment of the coin-free circuit of the present invention also provides means for preventing the fraudulent practices referred to above. Also, means are provided for forwarding a "phantom coin" signal to a central office requiring such a signal for call completion.

The preferred embodiment of the present invention also provides for the generation of a "fast busy" tone back to the telephone receiver, in order to advise the calling party that a restricted number of digits have been attempted.

The Drawings

FIGS. 1a and 1b, taken together, are a schematic representation of the preferred embodiment of a coin-free circuit in accordance with the present invention.

DETAILED DESCRIPTION

Figure 1A:
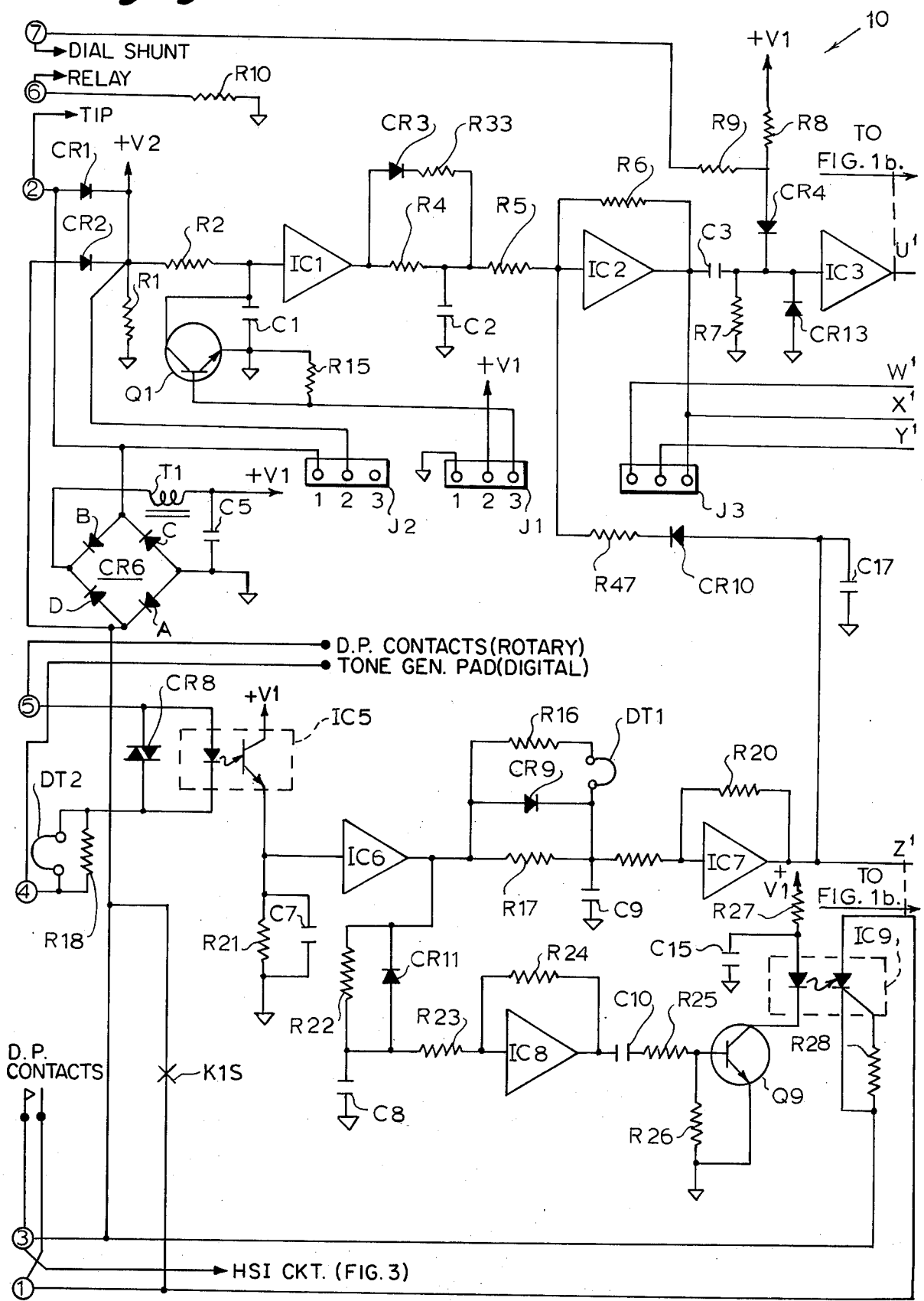

A preferred embodiment of a coin-free operating circuit useful in conjunction with telephone pay station operation is shown in FIGS. 1a and 1b, and described with reference thereto. It will be understood by those skilled in the art that, while not shown in the drawing, the coin-free circuit, referred to generally as 10, is used with a telephone pay station which is coupled to a central office via tip and ring line conductors. As will also be understood, the pay station includes a telephone handset having a receiver and transmitter associated therewith, the pay station further including a hook switch and dialing means, which may either comprise a conventional rotary dial, or a tone generator pad, such as the DIGITONE (registered trademark) dial as used by the Northern Electric Company Limited, or the TOUCH TONE (registered trademark) dial used in AT & T-related equipment.

Figure 2:
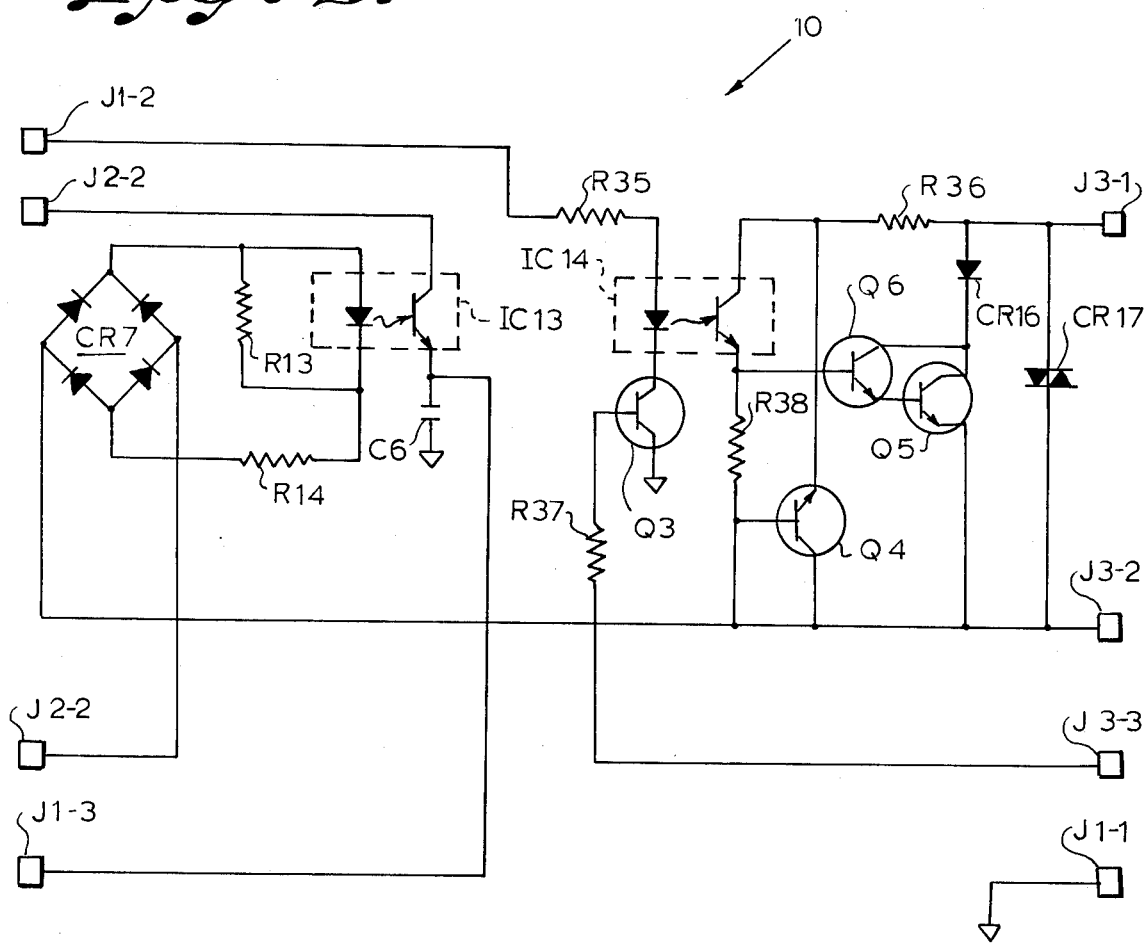
FIG. 2 is a schematic illustration of a "phantom coin" auxiliary circuit which may be used in conjunction with the circuits shown in FIGS. 1a and 1b.
Figure 3:
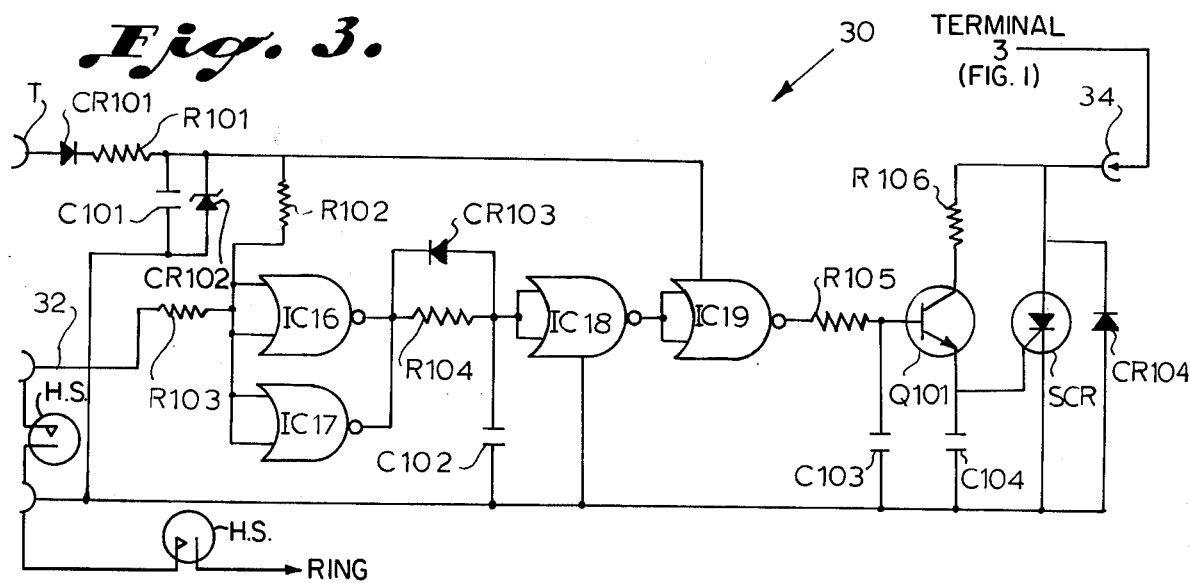
FIG. 3 is a schematic illustration of an anti-fraud auxiliary circuit which may be used in conjunction with the circuit shown in FIGS. 1a and 1b.

The electronic circuit shown in FIGS. 1a and 1b, as well as the auxiliary circuit shown in FIGS. 2 and 3, include capacitors and resistors, as well as digital integrated circuits, electronic switches and relays, all of which are illustrated using symbols well known in the electronic arts. Each component is identified with an appropriate letter, such as capacitor C, resistor R, integrated circuit IC, relay K, transistor Q, and so forth, followed by a reference number. While specific values and examples of the circuit components are set forth in the attached Appendix, it will be understood that changes in the circuit values or in the selection of components can be made without departing from the scope of the present invention.

The circuit 10 of FIGS. 1a and 1b includes nine terminals 1-9, which are coupled to the pay station electronics as follows: terminals 1 and 2 are respectively connected to the ring and tip conductors, with terminal 1 being coupled to the ring conductor through the standard dial pulse contacts (identified as "DP contacts" in FIG. 1), the hook switch inhibitor circuit (referred to as "HSI", and shown and described with reference to FIG. 3) and the normal pay station hook switch, which is identified as HS in FIG. 3. Terminals 1 and 3 are coupled across the dial pushing contacts in the case where a rotary dial is employed, or across the output terminals of a tone generator pad in a telephone that is equipped for digital dialing. Terminals 4 and 5 are likewise coupled across the dial pulsing contacts, when a rotary dial is employed. Terminal 6 is coupled to logic ground, and terminal 7 is coupled to the pay station dial shunt relay, which provides an indication when adequate coinage has been deposited in the pay station. Terminal 8 is coupled to ground, and terminal 9 is coupled to the coin trigger circuit associated with the pay station.

I. Offhook Detection and Time Delay

The circuit 10 is energized when the telephone handset is removed from the hook switch cradle to close the hook switch and cause current to flow between terminals 1 and 2 through the circuit 10. Specifically, electron current flows from terminal 1 through the dial pulsing contacts between terminals 1 and 3, through diode A of the bridge CR6 to logic ground 12, and then through the circuit 10 and back through diode B of the bridge CR6 via +V1 and the transformer T1 and thence to terminal 2. Capacitor C5 and transformer T1 filter out variations of current passing through the circuit 10. It will also be understood that current will flow from logic ground, designated by an arrowhead to distinguish it from conventional ground associated with terminal 8, through resistor R1 and through either diode CR1 or diode CR2, depending upon whether terminal 2 or terminal 1 is positive. The resulting voltage at V2 is unfiltered and is modulated by the current flow through transistor Q7, which is a fast busy tone amplifier described in greater detail below. After the circuit 10 is energized as described above, the voltage developed across resistor R1 is coupled across the combination of resistors R2 and capacitor C1. The combination of resistor R2 and capacitor C1 constitute a noise filter and prevent extraneous signals from passing into the offhook detector and timing circuit, described next.

When the voltage across capacitor C1 exceeds the threshold of the input to integrated circuit IC1, the output of that integrated circuit goes high instantaneously. However, resistor R4, resistor R33 (through diode CR3) and capacitor C2 produce a time delay, preferably on the order of about 350 milliseconds, before the output voltage of integrated circuit IC1 passes through the threshold of integrated circuit IC2. If the telephone handset is replaced on hook before this time, the output of integrated circuit IC1 will go by low, discharging capacitor C2 through resistor R4. If, however, the handset remains off the hook is excess of this predetermined time delay, the input threshold of integrated circuit IC2 will be intercepted.

The circuit defined by resistors R5 and R6, and integrated circuit IC2 embodies a design known in the electronics industry as a Schmidt trigger, which produces a "snap" action voltage at the output of integrated circuit IC2 whenever the input threshold thereof is intercepted. The output of integrated circuit IC2 is, in turn, differentiated by the combination of capacitor C3 and resistor R7, thus producing a pulse at the input terminal of integrated circuit IC3 of a definite time duration. Integrated circuit IC3 provides further shaping and delivers a reset pulse to the CLEAR terminal of integrated circuit IC4, which constitutes a storage and counting circuit, as is further described below. Additionally, the output of integrated circuit IC3 provides a reset pulse to transistor Q2 through resistor R11. Transistor Q2 allows the charge on capacitor C4 to flow through the first coil K1A of relay K1, it being understood that capacitor C4 was previously charged through resistor R12 via +V1 at the time the circuit 10 was energized. The relay K1 is a latching relay having two coils K1A and K1B, both of which operate a single switch contact K1S interposed in the power line between terminals 2 and 1 (tip and ring) and across the dialing means connected to terminals 1 and 3. It will be understood that switch K1S constitute the relay contacts associated with the relay K1, the switch having an open position which alows dialing signals to be placed between the tip and ring conductors, and a closed position wherein the dialing means, that is either the rotary dial or the tone generator, is shunted. When the first coil K1A of the relay K1 is energized as previously described, the switch contacts K1S are open, thereby allowing dialing. Since relay K1 is a latching relay, the switch contacts K1S will remain in one position until the appropriate coil K1A or K1B energizes the switch to the opposite condition.

II. Rotary Dial Operation

The circuit 10 is adapted for use with either a rotary dial or a tone generator dialing mechanism. In rotary dial operation, the jumpers at DT1 and DT2 are removed. In this condition, terminal 5 is parallel with terminal 3, and terminal 4 is parallel with terminal 1. The pulsing contacts of the rotary dial are therefore across terminals 4 and 5. When the rotary dial is at rest, the pulsing contacts are closed and therefore the voltage between terminals 4 and 5 is zero. However, when the pulsing contacts open, the central office battery voltage of 48 volts appears across terminals 4 and 5. The voltage pulses created by the intermittent opening and closing of thhe dial pulsing contacts causes similar pulses of current to flow through resistor R18 and through a light emitting diode associated with integrated circuit IC5. Integrated circuit IC5 is is an optoelectronic device employing a light emitting diode and a phototransistor adapted to turn on when electromagnetic emission is detected from the light emitting diode. The voltage developed across the light emitting diode of the integrated circuit IC5 is limited by the diode CR8, thus protecting integrated circuit IC5 from burn out. Integrated circuit IC5 thus provides a means for electrically isolating the input thereof from the output to the following circuit.

Resistors R21 and capacitor C7 constitute a noise filter for suppressing extraneous signals in the output of integrated circuit IC5. A "high" at the output of integrated circuit IC5 and the input of integrated circuit IC6 results in a "high" at the output terminal of integrated circuit IC6. This high is immediately transferred through diode CR9 to capacitor C9 with essentially no time delay. Resistors R19 R20 and integrated circuit IC7 constitute a second Schmidt trigger circuit of the type described above, which provides a snap action output to the input terminal of the counter integrated circuit IC4. Each transition from low to high at the counting input C of integrated circuit IC4 introduces a single count into that circuit. When the dial pulsing contacts reclose, the light emitting diode associated with integrated circuit IC5 extinguishes and the input terminal of integrated circuit IC6 goes low, thus causing the output terminal of that integrated circuit to also go low. At this time, capacitor C9 gives a discharge to resistor R17. A predesignated time delay, on the order of 200 milliseconds, is required for the voltage across capacitor C9 to reduce sufficiently to cause the Schmidt trigger defined by resistors R19 and R20 and integrated circuit IC7 to toggle low. Thus, if the pulsing contacts of the dial reopen before that inter-digit time delay capacitor C9 will recharge to full high and the Schmidt trigger will continue to hold the counter input terminal C of the integrated circuit IC4 high. This action produces what is referred to as "pulse train detection". That is, when a stream of pulses (from 1 to 10 pulses) are generated by the rotary dial, one and only one count is entered into the counter input C of integrated circuit IC4 for each dial pull. This inter-digit time is assumed to be greater than 200 milliseconds, but this value can be changed by adjusting the value of capacitor C9.

III. Tone Generator Dialing Means

When used with a tone generator dialing pad, the circuit 10 requires that the jumpers at DT1 and DT2 be installed. Also, terminal 4 is paralleled with terminal 3 and terminal 5 is connected to the source of current for the tone generator dial. Terminals 1 and 3 are connected across the tone generator dialing pad, but is not longer in series with the telephone loop current, because of the connection of terminal 3 to "ring" in the place of terminal 1. When a button is pressed on the tone generator dial pad, current flows into terminal 4, through integrated circuit IC5, and out of terminal 5. The output of integrated circuit IC5 is similar to that described above with reference to a rotary dial, except that there will be only one pulse for each button as contrasted to the rotary dial (where there may be between one to ten pulses for each dial pull). Each pulse is passed to the input of integrated circuit IC4, again as described above with respect to the rotary dial, except that the interdigit time delay of approximately 200 milliseconds is reduced to approximately 50 milliseconds by resistor R16. This insures that each individual button push of the tone generator will be counted.

In addition, the circuit 10 is provided with an anti-fraud arrangement for preventing the fraudulent practice described above as "finger walking". This anti-fraud circuit is coupled to the output of integrated circuit IC6, and consists of resistor R22, capacitor C8, diode CR11, transistor Q9 and integrated circuit IC8, plus other related components. Each time a button on the tone generator is pushed, the high at the output of the integrated circuit IC6 is delayed approximately 90 milliseconds by the combination of resistor R22 and capacitor C8, before that output will cause the Schmidt trigger defined by resistors R23, R24 and integrated circuit IC8 to toggle. When the output of integrated circuit IC8 toggles, that is, goes high, a pulse is coupled to the base of transistor Q9, turning that transistor on and causing a light emitting diode associated with integrated circuit IC9 to illuminate the silicon control rectifier also associated with integrated circuit IC9. In response to this illumination, the SCR fires and thereafter shorts the tone generator dial pad which is connected across terminals 1 and 3. The SCR will continue to conduct until its source of current is removed, that is, until all buttons on the tone generator dial pad are allowed to return to their normal "up" position. It will thus be understood that the tone generator dial pad is shorted after the time delay, until all of the buttons are in a release condition.

IV. Coin-Free Dialing

As described above with reference to the rotary dial and digital tone generator, it is understood that each individual dial pull of the rotary dial or button push on the digital tone generator is represented to the input C of the counter circuit IC4 as transitions from low to high. The counter circuit IC4 includes three or more outputs, three of which are labeled 1, 3 and 4 so as to preselect the number of digits that can be dialed coin-free. In actual use, the selected output represents a digit which is one more than the number of digits permitted; that is, two low to high transitions at the input of the counter IC4 are required to cause the "one" output to go high, four transitions to cause the "3" output to go high, and five transistions to cause the "4" output to go high. Of course, it will be recognized that this is provided so that one less than each of these number of digits can be dialed without causing restriction to take place by the circuit 10.

However, if the calling party attempts to dial any digits in excess of the coin-free number without depositing the required coinage, three things happen: first, the selected output at strap S1 goes high. This high is fed to a locking input L of the counter IC4, locking the counter in this condition so that it cannot be overrun. Second, the high out of strap S1 causes capacitor C11 to charge through resistor R34, thus making the base of transistor Q8 high through resistor R29. This causes transistor Q8 to turn on, causing capacitor C14 to discharge through the second coil K1B of the relay K1. The switch contacts K1S, which are coupled between terminals 1 and 3 are thereafter closed, thereby shunting the dialing means, either the rotary dial or the digital tone generator, preventing further attempted digits from being sent to the central office over the line conductors. Third, the high at strap S1 causes integrated circuit IC10 to go high. Integrated circuit IC10, IC11 with associated circuitry define a pulse generator circuit. Additionally, integrated circuits IC12 and 13, together with associated components, define a tone generator. When the output at strap S1 goes high, the input to integrated circuit IC10 goes high, causing the output of integrated circuit IC11 to go high, and low in a pulsing pattern, and thereafter causing a fast high and low alternation which is switched on and off by the output of IC11, at the output of integrated circuit IC13. This output is a "fast busy signal", the frequency of which is controlled by the components associated with the tone generator and the pulse generator, and this output is coupled to transistor Q7 through resistor R46. Transistor Q7 amplifies the "fast busy signal" which is then forwarded to the telephone receiver circuitry through resistor R45 via +V2. When the calling party hears this "fast busy signal" in his receiver, he can either hang up, or deposit the required coinage and complete his call. If the proper amount of coinage is deposited, the "fast busy signal" is terminated and the shunt across the dialing means is removed.

V. Local Rate Deposited

Most pay stations have a relay generally termed the "dial shunt relay" which serves the purpose of shunting the dialing means until the local rate coinage is deposited in the pay station. The circuit 10 is coupled across this relay at terminals 6 and 7. Before the deposit of coins in the pay station, terminals 6 and 7 are shorted by this relay making the anode of diode CR4 low, permitting the circuit 10 to operate in the manner described above. However, when the local coinage rate has been deposited, terminals 6 and 7 are open, allowing +V1 to be coupled through resistor R8 and diode CR4, making the input to integrated circuit IC3 continuously high. The output of integrated circuit IC3 will thus be high, turning transistor Q2 on causing current to flow through coil K1A, thereby holding relay K1 in a condition of reset. The reset input R of the counter IC4 is also held high, and thus continuously reset to prevent the counter from counting. This results in preventing integrated circuits IC10–13 from being turned on and preventing transistor Q8 from being turned on. Thus, the switch contacts K1S of relay K1 are held in an open position, and allows unrestricted local dialing.

VI. Phantom Coin Signal

An auxiliary circuit useful with the coin-free operated circuit 10 of FIGS. 1a and 1b is shown in FIG. 2 and described with reference thereto. As was discussed above, certain central offices require a coin ground signal from the pay station before a dialed call will be accepted and processed by the central office. The circuit 20 of FIG. 2 is designed to serve as a "plug-in" in module for use with the circuit 10 of FIGS. 1a and 1b to provide a "phantom coin" signal to the central office to provide an indication of coin presence, so that coin-free dialing of the restricted number of digits can be accomplished in the manner described above.

Noting FIG. 2, the circuit 20 includes eight terminals, which are coupled to plug-in terminal strips J2, J1 and J3, each of which have corresponding terminals 1, 2, or 3 as is identified by such reference numerals in FIGS. 1a and 1b, and by corresponding reference numerals in FIG. 2. Whenever a high appears at the output of integrated circuit IC2 (FIG. 1a) this high is coupled through connector J3-3 through resistor R3-7 to the base of transistor Q3, turning on the light emitting diode associated with integrated circuit IC14. The photo transistor associated with integrated circuit IC14 is turned on by illumination from the light emitting diode, which thereafter turns on transistors Q6 and Q5 to provide a conduction path from terminal J3-2 through transistor Q5 through diode CR16 to terminal J3-1. This conduction path from terminal J3-2 to terminal J3-1 simulates a coin ground, since terminal J3-1 connects to terminal 8 of the circuit 10 which is connected to earth ground, and terminal J3-2 connects to terminal 9, which is connected to the coin trigger switch in the pay station.

If a collect or refund signal is sent to the pay station from the central office, this signal appears between terminals 2 and 8 of the circuit 10, through terminals J3-1 and J2-2 to the circuit 20. This is coupled to the bridge circuit CR7, which provides a uni-directional current at its output terminals, regardless of the polarity applied (collect or refund). This current causes the light emitting diode of integrated circuit IC15 to illuminate the photo transistor associated therewith, developing a high at terminal J1-3, which causes transistor Q1 of circuit 10 to turn on and simulate an on-hook condition, which is held until the collect or refund signal is terminated. This, in turn, resets the electronics of circuit 10, and assures that there will be no phantom coin ground signal until approximately 350 milliseconds after the coin disposal signal is terminated. This satisfies the requirement that no coin signal be present for approximately 200 milliseconds after a coin disposal signal. Failure to provide this signal would indicate a "hung" coin to the central office, causing the central office system to hang up and trigger a "hung coin alarm" in the central office.

VII. Hook Switch Dialing Inhibitor

A second auxiliary circuit useful with the circuit 10 of FIGS. 1a and 1b is shown in FIG. 3 and described with reference thereto. The circuit of FIG. 3, referred to generally as 30, is useful for preventing a fraudulent practice known as "hook switch dialing", which is described in detail above.

The circuit 30 includes four terminals, two of which are coupled to the tip and ring conductors T and R, respectively. (The lead R couples to the ring conductor set of contacts through the hook switch in actual practice). These two terminals T and R provide power for the logic circuit associated with the circuit 30 through diode CR101, resistor R101, capcitor C101, and which is regulated by diode CR102. The third terminal 32 is connected to the hook switch, such that when the handset is on the on hook condition, the terminal 32 is disconnected. Thus, integrated circuits IC16 and IC17 are pulled high by resistor R102. from current flowing through the tip conductor and through terminal T. The outputs of integrated circuits IC16 and IC17 thus go low, and the output of integrated circuit IC19 goes low. Therefore, transistor Q1 will be off, and the silicon control rectifier SCR will remain in a nonconductive state. Since the current through the pay station must pass through the ring conductor and thus through terminal R, it thence passes to the SCR and through the fourth terminal 34 associated with the circuit 30 of FIG. 3, and the pay station path is interrupted by the hook switch and the SCR. When the handset is lifted off the hook, the hook switch contacts connected from terminal R to 32 close and causes integrated circuits IC16 and IC17 inputs to go low, and the outputs of those integrated circuits both go high. Capacitor C102 then starts to charge through resistor R104. After approximately 1 second, the voltage across capacitor C102 reaches the threshold of the input to integrated circuit IC18, causing the output of integrated circuit IC18 to go low, and therefore the output of integrated circuit IC19 to go high. This high output from integrated circuit IC19 through resistor R105 turns transistor Q101 on, triggering the SCR which completes the path to the pay station electronics. It thus can be seen that each time the hook switch is operated, a new 1 second timing interval is initiated. This predesignated time delay period is sufficient to cause the central office, in most cases, to treat the signal as a disconnect, drop the line, and when current starts again to return the dial tone. Thus, at any time the hook switch is operated, a dial tone will result. In some central offices, the delay will not be sufficiently long to cause a disconnect Nevertheless, the delay itself will be sufficient to destroy the simulated dial pulse information by a blurring effect caused by the 1 second delay.

APPENDIX

| Component | Value |
|---|---|
| R1 | 10 Kohm |
| R2 | 10 Kohm |
| R3 | 10 Kohm |
| R4 | 91 Kohm |
| R5 | 100 Kohm |
| R6 | 1 Mohm |
| R7 | 1 Mohm |
| R8 | 100 Kohm |
| R9 | 10 Kohm |
| R10 | 10 Kohm |
| R11 | 100 Kohm |
| R12 | 10 Kohm |
| R13 | 2.2 Kohm |
| R14 | 47 Kohm |
| R15 | 1 Mohm |
| R16 | 47 Kohm |
| R17 | 220 Kohm |
| R18 | 22 Kohm |
| R19 | 100 Kohm |
| R20 | 1 Mohm |
| R21 | 1 Mohm |
| R22 | 100 Kohm |
| R23 | 100 Kohm |
| R24 | 1 Mohm |
| R25 | 100 Kohm |
| R26 | 100 Kohm |
| R27 | 10 Kohm |
| R28 | 47 Kohm |
| R29 | 100 Kohm |
| R30 | 10 Kohm |
| R33 | 56 Kohm |
| R34 | 1 Mohm |
| R35 | 5.6 Kohm |
| R36 | 56 Kohm |
| R37 | 100 Kohm |
| R38 | 1 Mohm |
| R39 | 100 Kohm |
| R40 | 100 Kohm |
| R41 | 100 Kohm |
| R42 | 680 Kohm |
| R43 | 100 Kohm |
| R44 | 220 Kohm |
| R45 | 2 Kohm |
| R46 | 100 Kohm |
| R47 | 10 Kohm |
| C1 | 1 MF |
| C2 | 10 MF |
| C3 | 0.5 MF |
| C4 | 10 MF |
| C5 | 220 MF |
| C6 | 2.2 MF |
| C7 | .01 MF |
| C8 | 1 MF |
| C9 | 1 MF |
| C10 | .1 MF |
| C11 | 1 MF |
| C12 | .33 MF |
| C13 | .01 MF |

APPENDIX-continued

| Component | Value |
|---|---|
| C14 | 10 MF |
| C15 | 10 MF |
| C17 | .1 MF |
| R101 | 10 Kohm |
| R102 | 1 Mohm |
| R103 | 100 Kohm |
| R104 | 1 Mohm |
| R105 | 1 Mohm |
| R106 | 47 Kohm |
| C101 | 47 MF |
| C102 | 1 MF |
| C103 | .01 MF |
| C104 | .01 MF |

I claim:

1. In a telephone system including a pay station having a receiver and a transmitter coupled to a central office by a pair of line conductors through a hook switch and dialing means associated therewith, said paystation operable for initiating calls only upon the insertion therein of a coin or the like, said system including coin-free operating means for rendering said pay station operable for initiating calls without the insertion of said coin, said coin-free operating means comprising:
   first means for detecting an offhook condition of said hook switch;
   second means having at least two operating conditions, including a first condition for suppressing calls from said pay station and a reset condition for allowing calls to be transmitted from said pay station to said central office along said line conductors;
   third means for receiving inputs responsive to operation of said dialing means for preventing further dialing from said pay station to said central office after a preselected number of digits have been dialed; and
   fourth means coupled to said second means and responsive to detection of said offhook condition by said first means for resetting said second means to thereafter allow dialing of said preselected number of digits only after a predetermined time delay.

2. A telephone system as recited in claim 1 wherein said pay station includes means for detecting the presence of a coin therein and providing an output representative thereof, said coin-free operating means further comprising means for bypassing said first and fourth means and coupled to said second means for holding said second means continuously in said reset condition responsive to said output from said pay station coin-detecting means to thereby allow unrestricted calling from said pay station.

3. A telephone system as recited in claim 2 further comprising means for suppressing operation of said third means responsive to said output from said pay station coin-detecting means.

4. A telephone system as recited in claim 1 further comprising means for coupling said third means to an output of said fourth means for resetting said third means coincident with said resetting of said second means.

5. A telephone system as recited in claim 1 wherein said pay station dialing means includes a digital tone generator for initiating audible tones on said line conductors, said tones representative of the digits in a call being placed from said pay station, said coin-free operating means further comprising:

means for receiving an output representative of each tone output from said tone generator for thereafter shorting said tone generator following a designated time delay; and means for removing said shorting means responsive to termination of each output from said tone generator.

6. A telephone system as recited in claim 1 wherein said second means comprises means for shunting said dialing means during said predetermined time delay and after dialing of said preselected number of digits.

7. A telephone system as recited in claim 6 wherein said third means comprises means for detecting all of the dial pulses for each dialed digit and providing a single output for each digit.

8. A telephone system as recited in claim 7 further comprising means for recieving and sequentially storing counting information for each single output for each digit dialed.

9. A telephone system as recited in claim 8 further comprising means for electrically isolating said receiving and storing means from said dialing relay.

10. A telephone system as recited in claim 8 wherein said receiving and sequential storing means includes means for determining said preselected number of digits and providing an output after said preselected number of digits are dialed.

11. A telephone system as recited in claim 10 wherein said shunting means comprises a relay having a first coil and a switch, said switch opened or shunted across said dialing means responsive to current flowing through said first coil from operation of said first and fourth means.

12. A telephone system as recited in claim 11 wherein said relay includes a second coil, said switch open or shunted across said dialing means caused by current flowing through said second coil responsive to said output from said receiving and storing means.

13. A telephone system as recited in claim 12 further comprising means for generating a busy tone and transmitting said busy tone to said receiver responsive to said output from said receiving and storing means.

14. A telephone system as recited in claim 13 wherein said busy tone generating means is coupled to an output of said first means for suppressing operation of said busy tone generating means until detection of said offhook condition.

15. A telephone system as recited in claim 1 wherein said central office requires a signal representative of the presence of said coin in said pay station before a call from said pay station can be dialed, said coin-free operating means further comprising means bypassing said first means for generating a phantom presence signal to said central office.

16. A telephone system as recited in claim 1 further comprising means coupled between said hook switch and said pay station for detecting each operation of said hook switch and preventing call transmission from said pay station for a predesignated time delay after each hook switch operation, said predesignated time delay being substantially greater than said predetermined time delay.

17. A telephone system as recited in claim 1, wherein said coin-free operating means comprises having only one wire pair connected to said line conductors through said hook switch.

18. A telephone system including a telephone station having a receiver and a transmitter coupled to a central office by a pair of line conductors through a hook switch and dialing means, said system comprising:

first means for detecting an off hook condition of said hook switch;

second means for receiving inputs responsive to operation of said dialing means and for providing an output after a preselected number of digits have been dialed;

third means for suppressing calls from said station responsive to said output from said second means;

fourth means for generating a busy audible signal responsive to said output from said second means and for transmitting said busy audible signal to said receiver; and fifth means for suppressing operation of said fourth means until the detection of said offhook condition by said first means and initiation of said output from said second means.

19. A telephone system as recited in claim 18 further comprising means for resetting said second means responsive to detection of said offhook condition by said first means.

20. A telephone system as recited in claim 19 wherein said third means comprises:

a latching relay having first and second coils and a switch operated by said first and second coils, said switch having an open position and a closed position for preventing calls from said station; and wherein said second coil is coupled to receive said output from said second means.

21. A telephone system as recited in claim 20 further comprising means with said first means for restricting said output from said first means until after a predetermined time delay.

22. A telephone system as recited in claim 20 further comprising means coupling said first coil to an output of said first means for operating said switch to said open position responsive to detection of said offhook condition by said first means.

23. A telephone system as recited in claim 18 wherein said station dialing means includes a digital tone generator for initiating audible tones on said line conductors, said tones representative of the digits in a call being placed from said pay station, said coin-free operating means further comprising:

means for receiving an output representative of each tone output from said tone generator for thereafter shorting said tone generator following a designated time delay; and means for removing said shorting means responsive to termination of each output from said tone generator.

24. A telephone system as recited in claim 18 further comprising:

means coupled between said hook switch and said station for detecting each operation of said hook switch and preventing call transmission from said station for a predesignated time delay after each hook switch operation, said predesignated time delay being substantially less than said predetermined time delay.

25. In a telephone system including a pay station having a receiver and a transmitter coupled to a central office by a pair of line conductors through a hook switch and a dialing means associated therewith, said pay station operable for initiating calls only upon the insertion therein of a coin or the like, said central office requiring a signal representative of the presence of said coin in said pay station before a call from said pay station can be dialed, said system including coin-free operating means for rendering said pay station operable for initiating calls without the insertion of said coin, said coin-free operating means comprising:

first means for detecting an offhook condition of said hook switch;

second means having at least two operating conditions, including a first condition for suppressing calls from said pay station and a reset condition for allowing calls to be transmitted from said pay station to said central office along said line conductors;

third means coupled to said second means and responsive to detection of said offhook condition by said first means for resetting said second means only after a predetermined time delay; and fourth means bypassing said third means for generating a coin presence signal to said central office.

26. A telephone system as recited in claim 25 further comprising means coupled between said hook switch and said pay station for detecting each operation of said hook switch and preventing call transmission from said pay station for a predesignated time delay after each hook switch operation, said predesignated time delay being substantially less than said predetermined time delay.

27. A telephone system as recited in claim 26 wherein said pay station dialing means includes a digital tone generator for initiating audible tones on said line conductors, said tones representative of the digits in a call being placed from said pay station, said coin-free operating means further comprising:

means for recieving an output representative of each tone output from said tone generator for thereafter shorting said tone generator following a designated time delay; and means for removing said shorting means responsive to termination of each output from said tone generator.

28. A telephone system as recited in claim 27 wherein said pay station includes means for detecting the presence of a coin therein and providing an output representative thereof, said coin-free operating means further comprising means for bypassing said first, third and fourth means and coupled to said second means for holding said second means continuously in said reset condition responsive to said output from said pay station coindetecting means to thereby allow unrestricted calling from said pay station.

29. In a telephone system including a pay station having a receiver and a transmitter coupled to a central office by a pair of line conductors through a hook switch and dialing means associated therewith, said pay station operable for initiating calls only upon the insertion therein of a coin or the like, said system including coin-free operating means for rendering said pay station operable for initiating calls without the insertion of said coin, said coin-free operating means comprising:

first means for detecting an offhook condition of said hook switch;

second means having at least two operating conditions, including a first condition for suppressing calls from said pay station and a reset condition for allowing calls to be transmitted from said pay station to said central office along said line conductors;

third means for receiving inputs responsive to operation of said dialing means for preventing further dialing from said pay station to said central office after a preselected number of digits have been dialed; and wherein said first and third means are together coupled to said line conductors by a single wire pair through one pair of leaves of said hook switch.

* * * * *

UNITED STATES PATENT OFFICE
CERTIFICATE OF CORRECTION

Patent No. 4,063,036  Dated December 13, 1977

Inventor(s) William Robert Hunsicker

It is certified that error appears in the above-identified patent and that said Letters Patent are hereby corrected as shown below:

On the title page add the following:

-- [73] Assignee: Akzona Incorporated, Asheville, N. C. --.

Signed and Sealed this

Sixth Day of June 1978

[SEAL]

Attest:

RUTH C. MASON
*Attesting Officer*

DONALD W. BANNER
*Commissioner of Patents and Trademarks*